United States Patent
Lubetz et al.

(10) Patent No.: US 10,487,554 B2
(45) Date of Patent: Nov. 26, 2019

(54) ACTUATOR FOR MOVABLE FURNITURE PARTS

(71) Applicant: Julius Blum GmbH, Hoechst (AT)

(72) Inventors: Simon Lubetz, Hoechst (AT); Malte Schmid, Lindau (DE)

(73) Assignee: JULIUS BLUM GMBH, Hoechst (AT)

( * ) Notice: Subject to any disclaimer, the term of this patent is extended or adjusted under 35 U.S.C. 154(b) by 51 days.

(21) Appl. No.: 15/474,452

(22) Filed: Mar. 30, 2017

(65) Prior Publication Data

US 2017/0204645 A1   Jul. 20, 2017

Related U.S. Application Data

(63) Continuation of application No. PCT/AT2015/000124, filed on Sep. 28, 2015.

(30) Foreign Application Priority Data

Nov. 21, 2014  (AT) .................................. A 842/2014

(51) Int. Cl.
  *E05F 1/10*   (2006.01)
  *F16H 25/18*  (2006.01)

(52) U.S. Cl.
  CPC ........... *E05F 1/1058* (2013.01); *F16H 25/18* (2013.01); *E05Y 2201/624* (2013.01);
  (Continued)

(58) Field of Classification Search
  CPC ............. E05F 1/1058; E05Y 2201/624; E05Y 2201/638; E05Y 2600/12; E05Y 2900/20; F16H 25/18
  (Continued)

(56) References Cited

U.S. PATENT DOCUMENTS 2,824,466 A * 2/1958 Skwarek ................. F16H 53/04
                                                                 74/568 R
3,680,406 A * 8/1972 Bush ....................... F16H 53/04
                                                                 74/568 FS
(Continued)

FOREIGN PATENT DOCUMENTS

AT     513387       4/2014
CN   101809245     8/2010
(Continued)

OTHER PUBLICATIONS

English translation of Search Report dated Jan. 22, 2018 in Chinese Application No. 201580056115.5.
(Continued)

*Primary Examiner* — Daniel J Troy
*Assistant Examiner* — Timothy M Ayres
(74) *Attorney, Agent, or Firm* — Wenderoth, Lind & Ponack, L.L.P.

(57) ABSTRACT

An actuating drive for moving a movable furniture part includes at least one actuating arm pivotally mounted about a pivoting axis for moving the movable furniture part, a spring device for applying a force to the actuating arm, and a transmission mechanism for transmitting a force of the spring device to the actuating arm. The transmission mechanism includes an actuating portion motionally coupled to the actuating arm, a setting contour arranged on the actuating portion, and a pressure portion pressurized by the spring device. The pressure portion is displaceable along the setting contour upon a movement of the actuating arm. An adjustment device is provided by which a position of the setting contour relative to the actuating portion can be adjusted.

15 Claims, 7 Drawing Sheets

(52) U.S. Cl.
CPC ..... *E05Y 2201/638* (2013.01); *E05Y 2600/12* (2013.01); *E05Y 2900/20* (2013.01)

(58) Field of Classification Search
USPC ............................... 312/319.1, 319.2, 319.4
See application file for complete search history.

(56) References Cited

U.S. PATENT DOCUMENTS

| | | | |
|---|---|---|---|
| 3,792,627 A * | 2/1974 | Tarello | F16H 53/04 74/568 FS |
| 5,172,569 A | 12/1992 | Schnurrer | |
| 7,240,974 B2 * | 7/2007 | Hirtsiefer | E05D 15/262 312/109 |
| 7,500,287 B2 | 3/2009 | Brustle | |
| 7,798,541 B2 | 9/2010 | Hirtsiefer | |
| 7,810,213 B2 | 10/2010 | Brustle | |
| 8,590,107 B2 | 11/2013 | Omann | |
| 9,498,062 B2 | 11/2016 | Baldreich et al. | |
| 9,903,145 B2 * | 2/2018 | Huber | E05F 1/1058 |
| 2001/0039762 A1 | 11/2001 | Giovannetti | |
| 2004/0239213 A1 | 12/2004 | Hirtsiefer | |
| 2005/0218383 A1 | 10/2005 | Hirtsiefer et al. | |
| 2006/0279092 A1 | 12/2006 | Hirtsiefer | |
| 2007/0124893 A1 * | 6/2007 | Brustle | E05F 1/1075 16/296 |
| 2008/0121490 A1 | 5/2008 | Dubach et al. | |
| 2009/0064457 A1 | 3/2009 | Brustle | |
| 2010/0162847 A1 | 7/2010 | Gassner | |
| 2011/0193458 A1 | 8/2011 | Omann | |
| 2015/0351539 A1 | 12/2015 | Baldreich et al. | |

FOREIGN PATENT DOCUMENTS

| | | |
|---|---|---|
| DE | 10 2004 019 785 | 11/2005 |
| EP | 1 148 200 | 10/2001 |
| EP | 1 154 109 | 11/2001 |
| EP | 1 296 011 | 3/2003 |
| EP | 1 625 270 | 2/2006 |
| EP | 1 840 309 | 10/2007 |
| EP | 1 990 494 | 11/2008 |
| EP | 1 999 328 | 12/2008 |
| EP | 2 003 276 | 12/2008 |
| GB | 2 338 027 | 12/1999 |
| JP | 59-17005 | 2/1984 |
| JP | 5-86563 | 4/1993 |
| WO | 03/097973 | 11/2003 |
| WO | 2006/005086 | 1/2006 |
| WO | 2007/112800 | 10/2007 |
| WO | 2010/051569 | 5/2010 |

OTHER PUBLICATIONS

International Search Report dated Dec. 16, 2015 in International (PCT) Application No. PCT/AT2015/000124.
Search Report dated Jun. 19, 2015 in Austrian Application No. A 842/2014, with English translation.
Salice Catalogue, published 1990.
Explanatory sketch of the C2AF according to Salice Catalogue published 1990.
Salice Catalogue, published 1991.
Excerpt from the magazine Compomobili, published 2010.

* cited by examiner

ACTUATOR FOR MOVABLE FURNITURE PARTS

BACKGROUND OF THE INVENTION

The present invention relates to an actuating drive for moving a movable furniture part, including: at least one actuating arm pivotally mounted about a pivoting axis for moving the movable furniture part, a spring device for applying a force to the actuating arm, and a transmission mechanism for transmitting a force of the spring device to the actuating arm. The transmission mechanism includes an actuating portion which is motionally coupled to the actuating arm, a setting contour arranged on the actuating portion, and a pressure portion which is pressurized by the spring device. The pressure portion is displaceable along the setting contour upon a movement of the actuating arm.

The invention further relates to an arrangement having a movable furniture part and an actuating drive of the type to be described.

WO 2006/005086 A1 discloses an actuating drive for moving furniture flaps, in which the force of a spring device can be transmitted by a transmission mechanism to a pivotally mounted actuating arm. The transmission mechanism thereby includes an intermediate lever which is pressurized by the spring device, and the intermediate lever pivots the actuating arm by a pressure roller and a setting contour. For adjusting the spring force, a fastening location of the spring device on the intermediate lever can be adjusted along a threaded spindle. For this purpose, a respective long adjusting path needs to be provided which increases the installation space which is required for the actuating drive.

SUMMARY OF THE INVENTION

It is an object of the present invention to provide an actuating drive of the type mentioned in the introductory part, having a more compact construction.

According to the invention, an adjustment device is provided by which a position of the setting contour relative to the actuating portion can be adjusted. In other words, the actuating drive includes a movable actuating portion which, upon a movement of the actuating arm, moves therewith. A setting contour is arranged or formed on this actuating portion, and the setting contour can be adjusted relative to the actuating portion, preferably relative to a pivoting axis of the actuating portion, by a manual actuation of the adjustment device.

The advantage of this construction firstly lies in a reduced adjustment path, because by an adjustment of the setting contour relative to the actuating portion, influence is directly made on the pre-stressing of the spring and/or on the torque progression of the actuating arm. In this way, for example, the arrangement of relatively large threaded spindles—by way of which a fastening location of the spring device can be adjusted relative to the pivoting axis of an intermediate lever—can be omitted. The required adjustment path can therefore—with a force range equally covered in comparison to the state of art—be reduced accordingly, wherein very compact constructions of the actuating drive are made possible.

By way of a positional, preferably continuous, change of the setting contour relative to the actuating portion effected by the adjustment device, the torque and/or torque progression acting on the actuating arm and therefore acting on the movable furniture part can be variably adjusted. Thus, the actuating drive can be equally used for different weights, sizes and forms of furniture flaps, in particular also for folding flaps with flap portions which are hingedly connected to one another.

According to an embodiment, it can be provided that the spring device is interchangeably supported on the actuating drive, so that spring devices with different power factors can be selectively fastened to one and the same actuating drive. In this way, a person can select at the factory or also directly on the spot from a set of spring devices a power factor which corresponds to the respective weight of the furniture flap and with the height of the furniture carcass. After having selected the spring device, a precise force adjustment or fine tuning can be performed by an actuation of the adjustment device which exactly matches with the respective weight of the flap.

According to an embodiment, the adjustment device converts a rotational movement of an adjustment wheel, effected by a person, into a longitudinal movement of the setting contour. The adjustment device expediently has a self-locking configuration, so that the performed adjustment, without further intervention, remains in place in each pre-adjusted position. The adjustment device can have, for example, a worm gear, a spiral-shaped guide interacting with a tooth arrangement, a gear interacting with a toothed rod or also a self-locking eccentric.

BRIEF DESCRIPTION OF THE DRAWINGS

Further details and advantages of the present invention result from the embodiments shown in the drawings, wherein.

DETAILED DESCRIPTION OF THE INVENTION

Figure 1A:
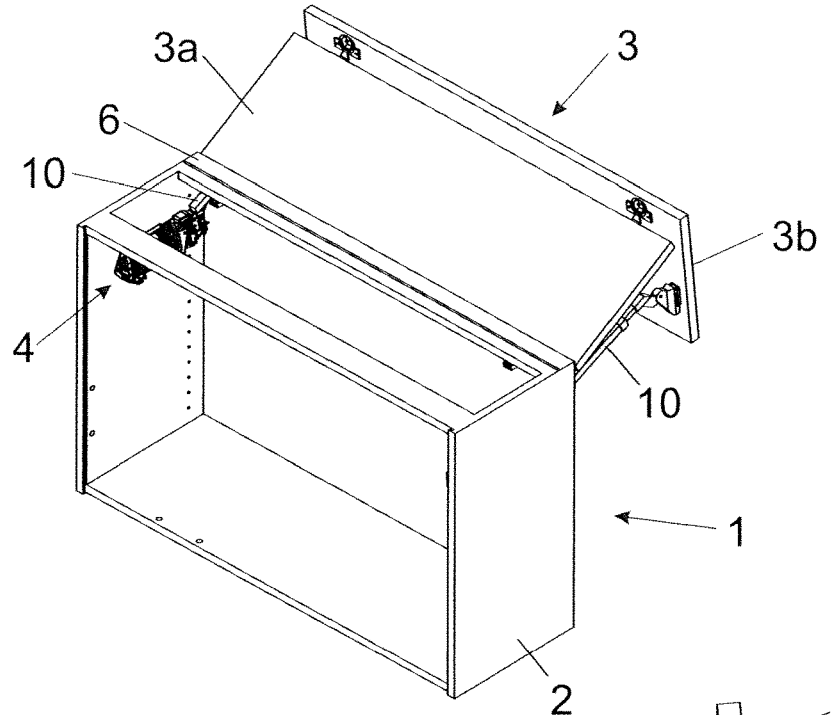
FIG. 1a, 1b are, respectively, a perspective view of an item of furniture having a furniture carcass and a movable furniture part, and a side view of the actuating drive mounted to the furniture carcass.

FIG. 1a shows an item of furniture 1 having a furniture carcass 2 and a movable furniture part 3 in a perspective view. The movable furniture part 3, in the shown figure, is formed as a bi-fold flap having two partial flaps 3a and 3b, in which the upper partial flap 3a is pivotally connected via first hinges 5a (FIG. 1b) to the cabinet top 6 and the lower partial flap 3b is hingedly connected via second hinges 5b to the upper partial flap 3a. For moving the movable furniture part 3, at least one actuating drive 4 is mounted to the furniture carcass 2, and the movable furniture part 3 can be moved between a closed position (in which both partial flaps 3a, 3b are arranged in a common vertical plane and thereby cover the furniture carcass 2) and an opening position (in which the partial flaps 3a, 3b assume an angled position relative to each other).

Figure 1B:
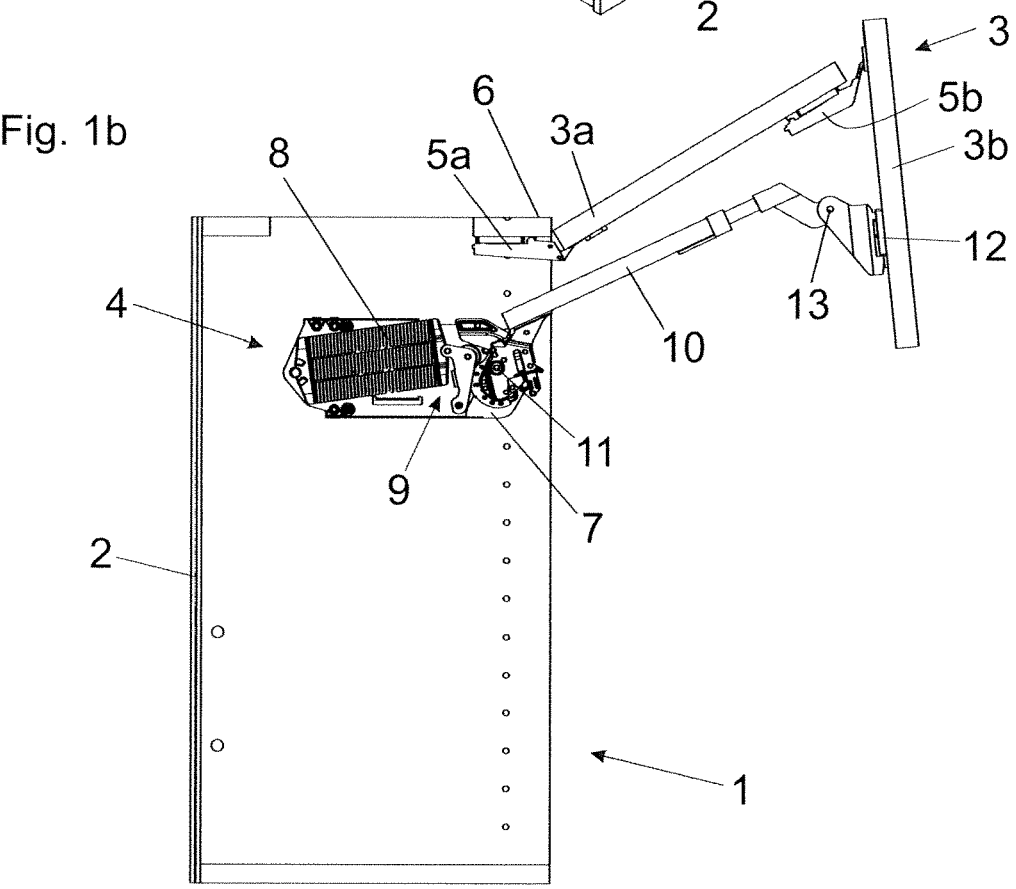

FIG. 1b shows a side view of the actuating drive 4 mounted to the furniture carcass 2, in which a spring device 8 is arranged in a housing 7 for assisting a movement of the furniture part 3. In the shown figure, the spring device 8 is in the form of a spring assembly having a plurality of helical springs, preferably compression springs, being switched in parallel relationship. The force of the spring device 8 can be transmitted by a transmission mechanism 9 to an actuating arm 10 which, on the one hand, is pivotally supported on the housing 7 about a pivoting axis 11, and, on the other hand, is pivotally connected via a hinged axis 13 to a fitting portion 12 to be fastened to the lower partial flap 3b. The actuating drive 4 is equally suitable for furniture flaps having a one-piece configuration, in particular for so-called up and over lift flaps (wherein the flap swings up over the cabinet), swinging flaps (wherein the flap is pivotally supported on the furniture carcass 2 about a horizontal axis), and lifting flaps (wherein the flap is vertically elevated).

Figure 2:
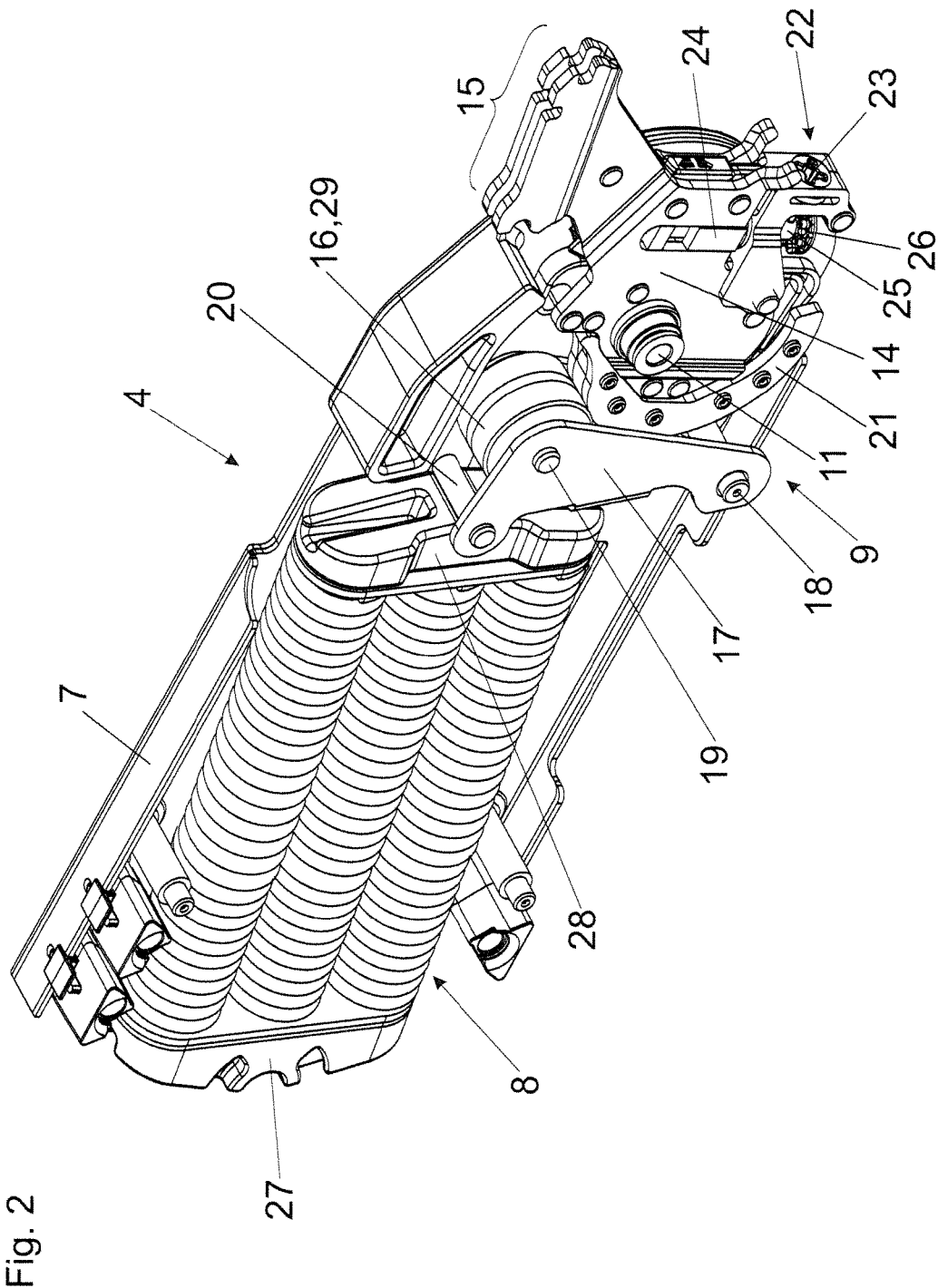
FIG. 2 shows an embodiment of an actuating drive in a perspective view.

FIG. 2 shows an embodiment of an actuating drive 4 with the transmission mechanism 9 in a perspective view. For applying a force to the actuating arm 10 (FIG. 1b), a spring device 8 is provided which is supported with a first end region 27 on the housing 7. The second end region 28 of the spring device 8 presses against a bolt 20 of a lever 17 which is pivotally mounted about a hinge axis 18 on the housing 7. For the tool-less exchange or replacement of the spring device 8 with a different power factor, the second end region 28 of the spring device 8 is to be pressed against the spring force by applying manual pressure in a direction towards the first end region 27, so that the spring device 8 is compressed and the loose connection between the second end region 28 and the bolt 20 can be released. The one-armed lever 17 has a pivot bearing 19 on which a pressure portion 16—preferably a rotatably supported pressure roller 29—is mounted. Arranged on the housing 7 is a movable, preferably pivotable about a pivoting axis 11, actuating portion 14, and the actuating portion 14 can be connected in a movement-coupled manner to the actuating arm 10 by way of a coupling device 15. Alternatively, it is also possible that the actuating portion 14, together with the actuating arm 10, has a one-piece configuration. A setting contour 21 is arranged or formed on the actuating portion 14, and a position of the setting contour 21 can be adjusted by an adjustment device 22 relative to the actuating portion 14, preferably relative to a pivoting axis 11 of the actuating portion 14. The pressure portion 16 in the form of the pressure roller 29 is pressed against the setting contour 21 by the force of the spring device 8. Thus, the pressure portion 16, upon a movement of the actuating arm 10 or of the actuating portion 14 coupled therewith, respectively, can be displaced, preferably rolled-off, along the setting contour 21.

The adjustment device 22 may include an adjustment wheel 23, wherein by rotating the adjustment wheel 23 by an actuating tool, the position of the setting contour 21 relative to the pivotally mounted actuating portion 14 can be adjusted. Preferably, a continuous adjustment of the position of the setting contour 21 can be achieved. It is, however, also possible to arrange the setting contour 21 relative to the actuating portion 14 on two or more predetermined locations differing from one another. In the shown embodiment, the adjustment wheel 23 interacts with a spur gear 26 of a threaded section 25, along which a bearing portion 24 is adjustably arranged. By an adjustment of the bearing portion 24, the position of the setting contour 21 movement-coupled therewith can also be adjusted.

Figure 3A:
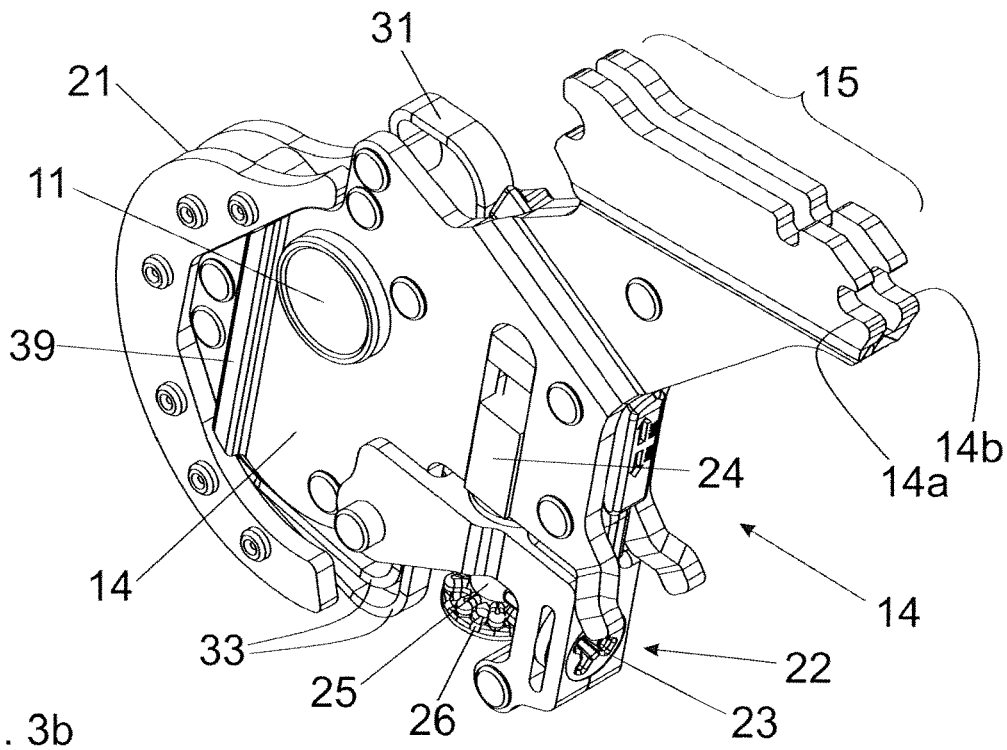
FIG. 3a, 3b show two different views of the actuating portion with the setting contour arranged thereon.

FIG. 3a shows the actuating portion 14 pivotally mounted about the pivoting axis 11, with the setting contour 21 arranged thereon. In the shown embodiment, the actuating portion 14 includes two components 14a, 14b which are spaced in parallel relationship to one another. By a turning movement of the adjustment wheel 23 effected by a person, the bearing portion 24 is moved along the threaded section 25, whereby also the position of the setting contour 21 relative to the actuating portion 14 can be adjusted.

Figure 3B:
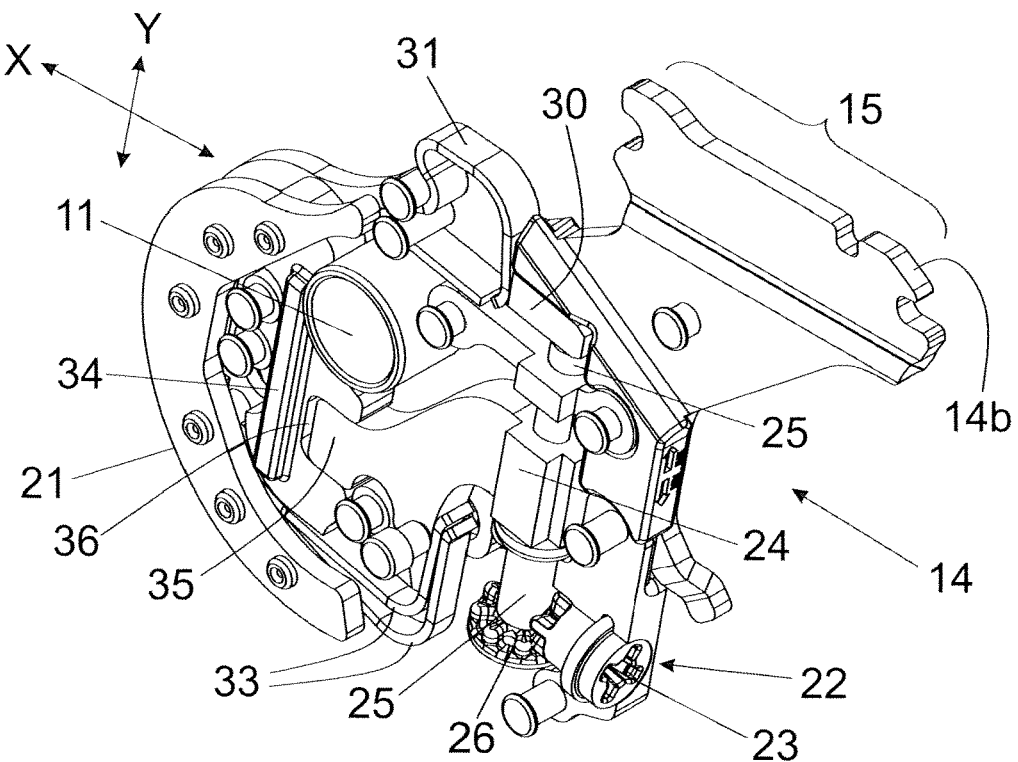

FIG. 3b shows the actuating portion 14 according to FIG. 3a without the front component 14a, so that the interaction of the adjustment wheel 23 with the spur gear 26 of the threaded section 25 and the interaction of the bearing portion 24 with the setting contour 21 can be seen. A guide element 34 with a recess 36 is connected to the setting contour 21, and a protrusion 35 of the adjustable bearing portion 24 engages in the recess 36 of the guide element 34. In this way, the position of the setting contour 21 relative to the pivoting axis 11 of the actuating portion 14 can be adjusted in the direction of (along) the depicted Y axis and/or in a direction of (along) the X axis, so that the torque progression exerted on the actuating arm 10 and/or the pre-stressing force of the spring device 8 can be variably adjusted. For the play-free arrangement of the threaded section 25, a wedge element 30 acted upon by a spring element 31 is provided, and the wedge element 30 restrains a movement of the threaded section 25 in the axial direction. For the play-free arrangement of the setting contour 21, at least one further spring element 33 is provided which presses the guide element 34 of the setting contour 21 against a guide 39 (FIG. 4) of the actuating portion 14.

The setting contour 21 forms a control curve which runs eccentrically to the pivoting axis 11 of the actuating portion 14 and influences the movement behavior of the movable furniture part 3 in terms of force. The setting contour 21 is movement-coupled to the actuating arm 10 such that, upon a pivoting movement of the actuating arm 10, the setting contour 21 also moves therewith. The setting contour 21 forms a differing radial spacing relative to the pivoting axis 11 of the actuating portion 14, so that at the end of the closing movement, a torque in the closing direction is exerted on the actuating arm 10. When the actuating arm 10 is being opened, the pressure portion 16 reaches an apex (that is the region of the setting contour 21 having the largest radial spacing relative to the pivoting axis 11), so that the spring device 8—after having passed this dead-center position—exerts a torque on the actuating arm 10 in the opening direction. The torque acting in the opening direction can be adjusted such that the movable furniture part 3 is held in place in each open position. For dampening the closing and/or opening movement of the actuating arm 10, a damper, in particular a fluid damper (which is not shown here) may be provided.

Figure 4:
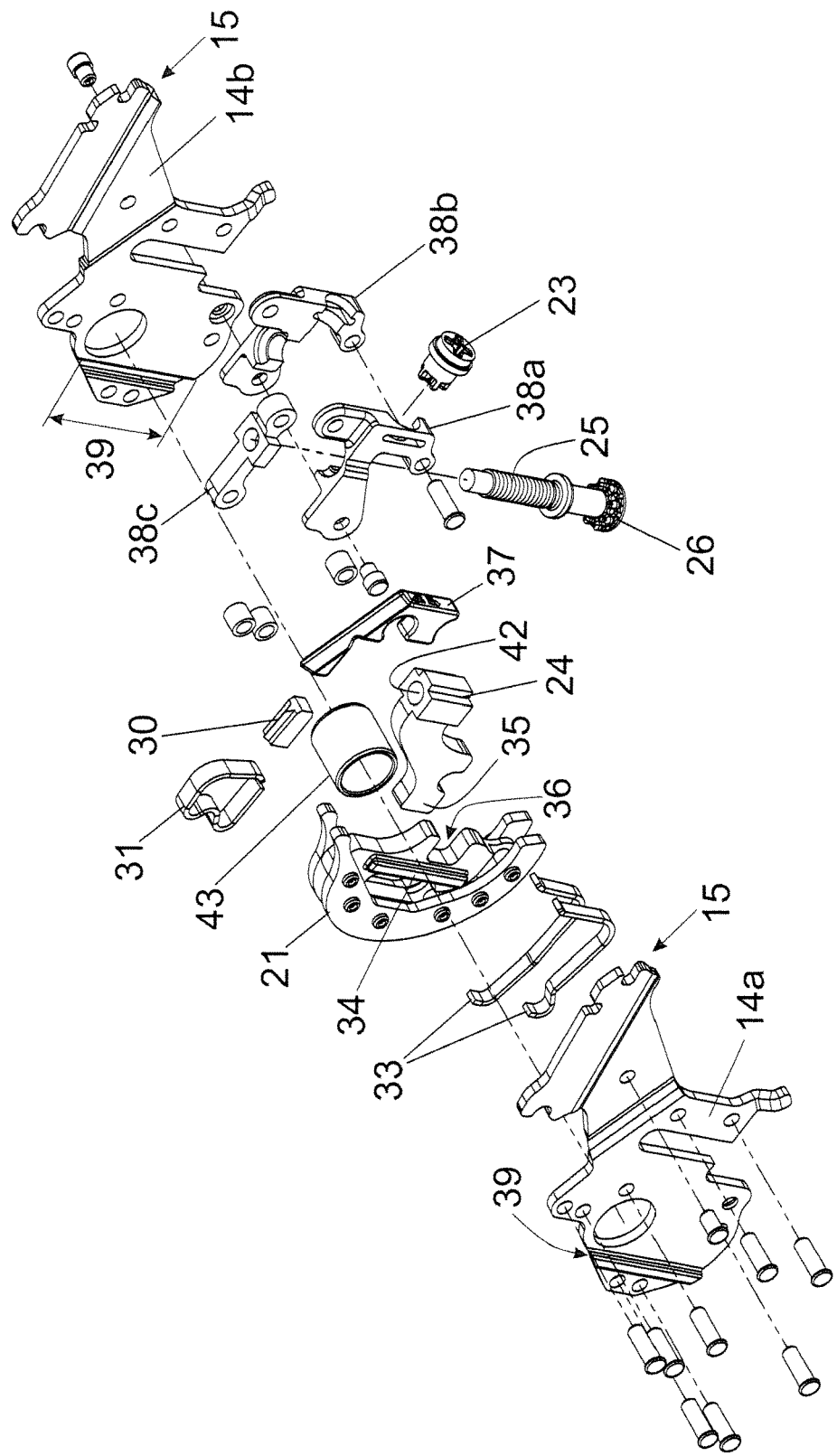
FIG. 4 shows the actuating drive in an exploded view.

FIG. 4 shows the actuating portion 14 depicted in FIG. 3a and FIG. 3b together with the setting contour 21 in an exploded view. The components 14a and 14b of the actuating portion 14 each have a guide 39 along which a corresponding guide element 34 of the setting contour 21 can be displaced by an actuation of the adjustment device 22. In the shown embodiment, the guides 39 have a linear course, so that the setting contour 21 can be adjusted along the Y axis (FIG. 3b), i.e. transverse to the operating direction of the spring device 8 along the X axis. By way of the respective form and size of the guide 39 (for example, by a curved course of the guide 39), the setting contour 21 can be adjusted along the X axis and/or along the Y axis (FIG. 3b), so that the pre-stressing of the spring device 8 and/or the torque progression acting on the actuating arm 10 can be variably adjusted. The adjustment device 22 with the adjustment wheel 23 as well as the threaded section 25 with the spur gear 26 are arranged within first and second holding portions 38a and 38b, and the threaded section 25 is in engagement with an internal thread 42 of the bearing portion 24 while the free end portion of the threaded section 25 reaches into an opening of a third holding portion 38c. The bearing portion 24 is adjustably arranged along the threaded section 25, and the bearing portion 24 has a protrusion 35 engaging in an opening (recess) 36 of the setting contour 21. A wedge element 30 pressurized by a spring element 31 interacts on the one hand with a counter bearing 37 and on the other hand with an end face of the threaded section 25, whereby the threaded section 25 is hindered in an undesired displacement in the axial direction. The guide element 34 of the setting contour 21 is pressed by further spring elements 33 in the form of plastic clips against the guide 39 of the components 14a, 14b, so that the setting contour 21 rests against the actuating portion 14 without play. The actuating portion 14, together with the setting contour 21, is fixed by a sleeve 43 to the housing 7 of the actuating drive 4.

Figure 5A:
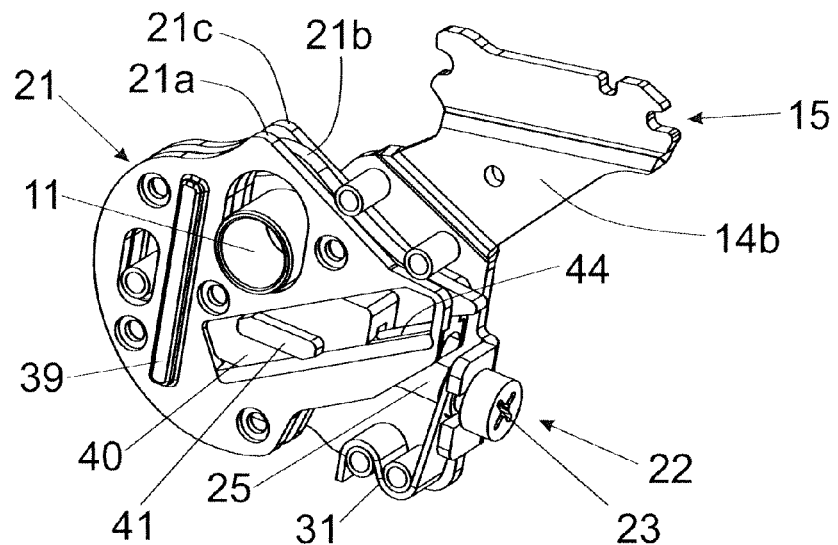
FIG. 5a-5c are different views of the actuating portion according to a further embodiment.
Figure 5B:
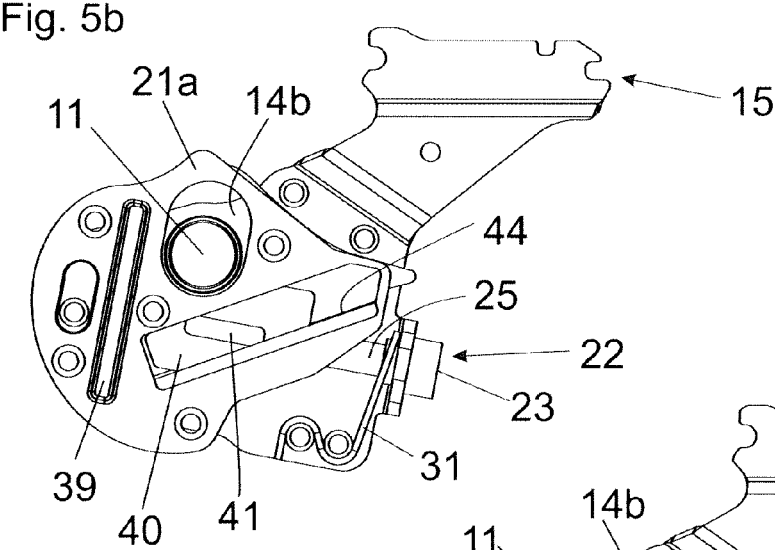
Figure 5C:
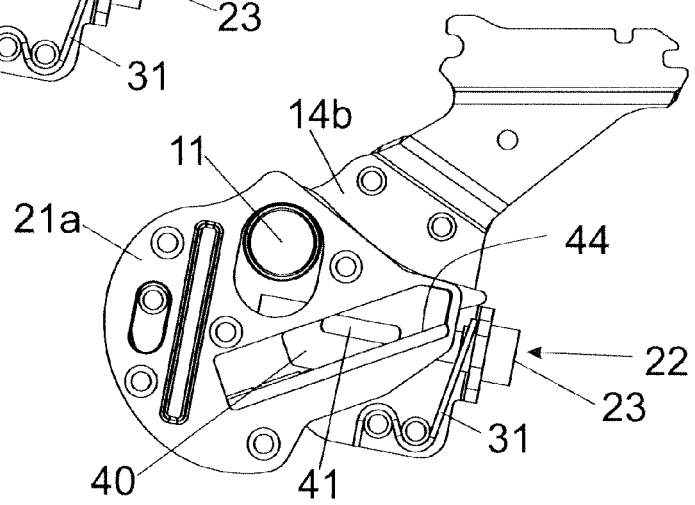

FIG. 5a-5c show the actuating portion 14 (which is formed by the component 14b and the component 14a which is not visible here) with the setting contour 21 according to a further embodiment. Here, the setting contour 21 is formed by a peripheral surface of three discs 21a, 21b, 21c which are arranged parallel to one another. The threaded section 25, which can be rotated by the adjustment wheel 23, interacts with a displaceable slider 40. At both sides of the slider 40, ribs 41 are provided which each engage in slanted slits 44 of the two outer discs 21a, 21c. By turning the adjustment wheel 23 with the aid of an actuating tool, all three discs 21a, 21b, 21c in one package can be elevated and lowered with respect to the pivoting axis 11 via the ribs 41. FIG. 5b shows the elevated position of the discs 21a, 21b, 21c forming the setting contour 21 relative to the pivoting axis 11 of the component 14b. FIG. 5c, in contrast, shows the lowered position of the discs 21a, 21b, 21c relative to the pivoting axis 11 of the actuating portion 14. By way of a spring element 31 in the form of a leaf spring, the threaded section 25 is secured without play in the axial direction.

Figure 6:
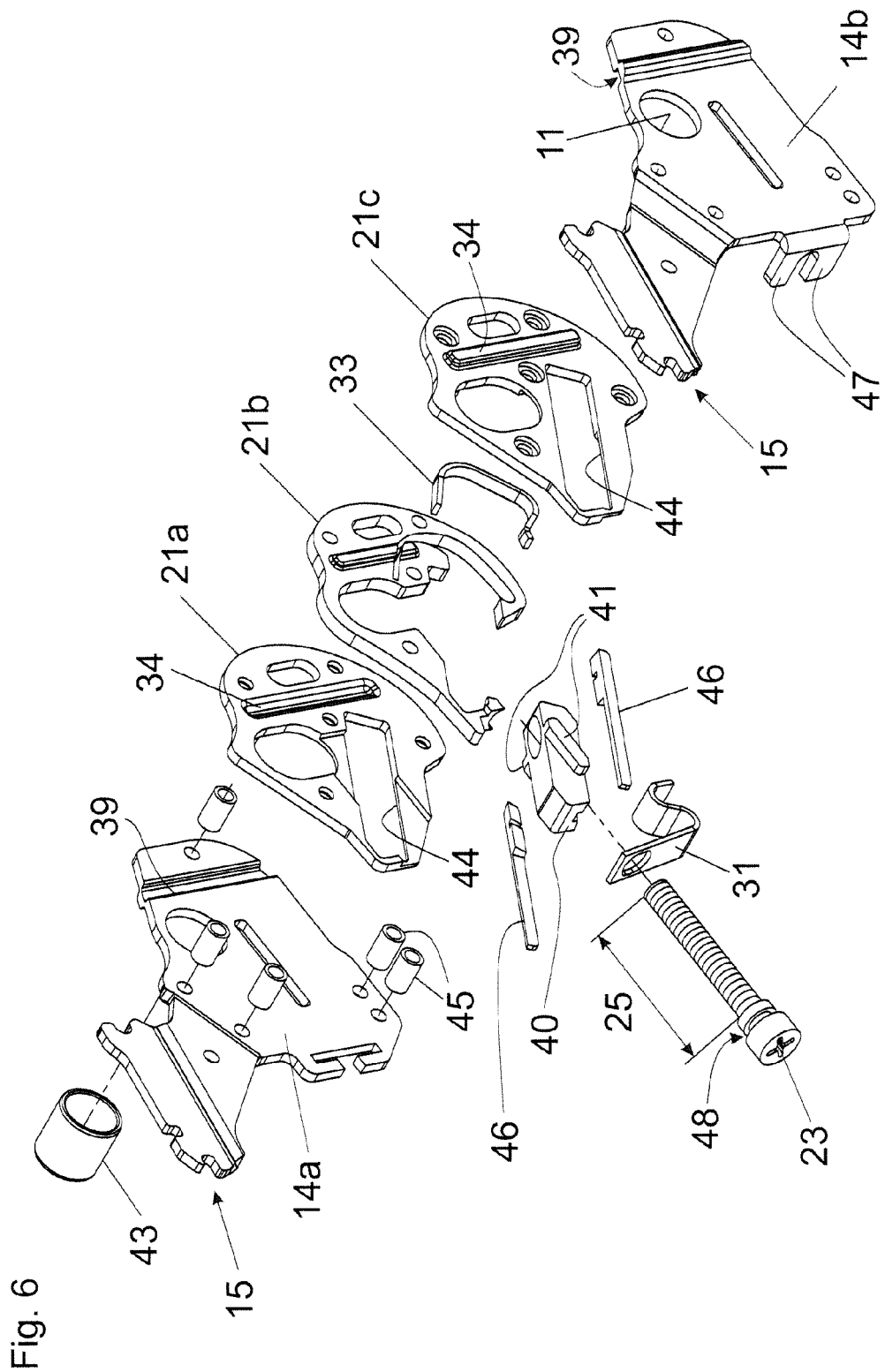
FIG. 6 shows the embodiment according to FIGS. 5a-5c in an exploded view.

FIG. 6 shows the embodiment according to FIGS. 5a-5c in an exploded view. The actuating portion 14 includes the components 14a and 14b which are parallel spaced from each other by a plurality of spacers 45. The setting contour 21 is formed by a peripheral surface of the discs 21a, 21b, 21c. The components 14a, 14b each have a guide 39 for displacably guiding a guide element 34 of the two outer discs 21a, 21c. The middle disc 21b is connected in a movement-coupled manner to the outer discs 21a, 21c. The threaded section 25 is in thread engagement with a slider 40, and by turning the adjustment wheel 23, the slider 40 can be adjusted along the threaded section 25. The discs 21a, 21b, 21c are adjustably arranged by ribs 41 which are arranged on both sides of the slider 40. The ribs 41 each engage in the slanted slits 44 of the discs 21a and 21c. For guiding the ribs 31 with low friction along the slits 44, plastic profiles 46 may be provided. By way of the spring element 31 in the form of the leaf spring, the threaded section 25 and the slider 40, respectively, are arranged on the slits 44 without play. The other spring element 33 pushes the guide elements 34 of the discs 21a, 21c in a play-free manner against the guides 39 of the components 14a, 14b. For supporting the adjustment wheel 23 on the component 14a, two bearing portions 47 are provided which each engage in a circumferential groove 48 formed between the adjustment wheel 23 and the threaded section 25, so that the threaded section 25 is pivotally, however axially non-displaceably, arranged on the component 14b. According to the shown embodiment, the adjustment wheel 23 is formed in one piece together with the threaded section 25. If appropriate, additional transmission elements may be provided between the adjustment wheel 23 and the threaded section 25. Preferably, the threaded section 25 includes a thread having a small thread pitch so that the self-locking of the slider 40 on the threaded section 25 can be improved.

Figure 7:
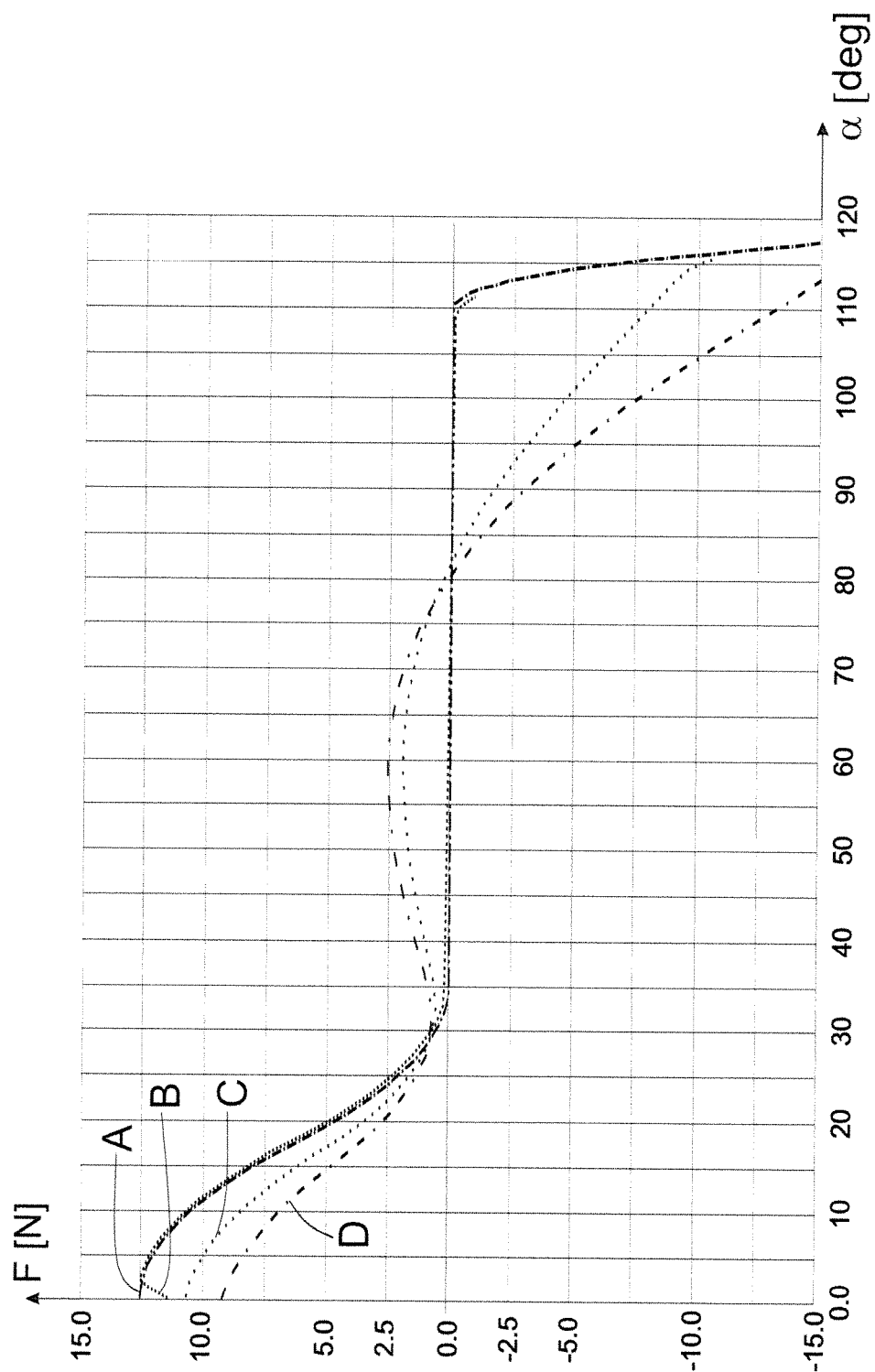
FIG. 7 is a chart showing the opening force progressions with different adjusted positions of the setting contour dependent on the opening angle of the upper partial flap according to FIGS. 1a, 1b.

FIG. 7 shows a possible progression of the opening force, Force F in Newton [N], of the upper partial flap 3a (FIG. 1a) dependent on the opening angle, in degree [deg], with different adjustment positions of the setting contour 21 relative to the actuating portion 14. Curve A shows the (theoretical) ideal progression, wherein the required force for opening the partial flap 3a, starting from 0° opening angle, immediately decreases and subsequently approaches zero at an opening angle of about 35°. Curve B shows the maximum adjustment of the adjustment device 22, wherein the torque exerted on the actuating arm 10 is set to its highest (thus for heavy furniture flaps. The required force for opening initially increases over a small opening angle range, and then also approaches zero at an opening angle of about 35°. Curve C shows the middle adjustment (thus for medium weight furniture flaps) with a reduced torque relative to curve B. Curve D finally shows the minimum adjustment (thus for lightweight furniture flaps), in which the torque exerted on the actuating arm 10 in the closing position is set to its lowest in comparison to the curves B and C. Even when the closing forces of the curves B, C, D, at an opening angle of 0° of the upper partial flap 3a, slightly deviate from one another, with the help of the displayed chart it becomes clear that the opening force progression of the curves B, C, D is substantially equal, independently from the adjusted position of the setting contour 21 relative to the actuating portion 14.

The term "change in position" of the setting contour 21 also includes the measure that only a partial section of the setting contour 21 can be adjusted by the adjustment device 22, whereby also the overall position of the setting contour 21 relative to the actuating portion 14 is altered. The partial section of the setting contour 21 can be, for example, movably arranged on a carrier and can be adjusted by way of the actuating device 22 relative to the carrier in a pivotable and/or in a linearly displaceable manner.

The invention claimed is:

1. An actuating drive for moving a movable furniture part, said actuating drive comprising:
   an actuating arm which is pivotally mounted about a pivoting axis for moving the movable furniture part,
   a spring device for applying a force to the actuating arm,
   a transmission mechanism for transmitting the force of the spring device to the actuating arm, the transmission mechanism including:
      an actuating portion which is motionally coupled to the actuating arm;
      a setting contour arranged on the actuating portion; and
      a pressure portion which is pressurized by the spring device, the pressure portion being displaceable along the setting contour upon a movement of the actuating arm; and
   an adjustment device configured to adjust a position of the setting contour relative to the actuating portion so as to adjust a maximum level of an amount of the force of the spring device transmitted to the actuating arm.

2. The actuating drive according to claim 1, wherein the adjustment device has an automatic locking configuration.

3. The actuating drive according to claim 1, wherein the adjustment device is configured to continuously adjust a position of the setting contour.

4. The actuating drive according to claim 1, wherein the adjustment device is configured to convert a rotational movement of an adjustment wheel into a longitudinal movement of the setting contour.

5. The actuating drive according to claim 1, wherein the actuating portion has a guide along which the setting contour is adjustably arranged, wherein a guide element connected to the setting contour is adjustably arranged along the guide.

6. The actuating drive according to claim 5, further comprising a spring element configured to press the guide element of the setting contour against the guide of the actuating portion.

7. The actuating drive according to claim 1, wherein the adjustment device, is configured to variably adjust prestressing of the spring device and/or torque progression acting on the actuating arm.

8. The actuating drive according to claim 1, wherein the spring device includes a helical spring.

9. The actuating drive according to claim 8, wherein the helical spring is a compression spring.

10. The actuating drive according to claim 1, wherein the pressure portion is in the form of a pivotally mounted pressure roller.

11. The actuating drive according to claim 1, wherein the actuating portion includes two or more components connected to one another.

12. The actuating drive according to claim 1, wherein the setting contour includes two or more discs connected to one another.

13. An arrangement comprising a movable furniture part and the actuating drive according to claim 1 for moving the movable furniture part.

14. An actuating drive for moving a movable furniture part, said actuating drive comprising:
   an actuating arm which is pivotally mounted about a pivoting axis for moving the movable furniture part,
   a spring device for applying a force to the actuating arm,
   a transmission mechanism for transmitting the force of the spring device to the actuating arm, the transmission mechanism including:
      an actuating portion which is motionally coupled to the actuating arm;
      a setting contour arranged on the actuating portion; and
      a pressure portion which is pressurized by the spring device, the pressure portion being displaceable along the setting contour upon a movement of the actuating arm; and
   an adjustment device configured to adjust a position of the setting contour relative to the actuating portion so as to adjust the force of the spring device transmitted to the actuating arm;
   wherein the adjustment device is configured to convert a rotational movement of an adjustment wheel into a longitudinal movement of the setting contour, and
   wherein the adjustment device includes a bearing portion to be driven along a threaded section by rotating the adjustment wheel, the setting contour being movement-coupled to the bearing portion.

15. The actuating drive according to claim 14, wherein the threaded section is arranged in a play-free manner in an axial direction by a wedge element which is acted upon by a spring element.

* * * * *